United States Patent
Wei et al.

(10) Patent No.: US 7,123,266 B2
(45) Date of Patent: Oct. 17, 2006

(54) METHOD AND APPARATUS FOR A VIDEO GRAPHICS CIRCUIT HAVING PARALLEL PIXEL PROCESSING

(75) Inventors: Tien En Wei, Marlborough, MA (US); Jason J Hou, Westford, MA (US); Richard J Fuller, Lexington, MA (US); Douglas Wade Duncan, Natick, MA (US)

(73) Assignee: ATI Technologies Inc., Markham (CA)

( * ) Notice: Subject to any disclaimer, the term of this patent is extended or adjusted under 35 U.S.C. 154(b) by 39 days.

(21) Appl. No.: 10/172,038

(22) Filed: Aug. 23, 2002

(65) Prior Publication Data
US 2003/0025699 A1 Feb. 6, 2003

Related U.S. Application Data

(63) Continuation of application No. 09/033,441, filed on Mar. 2, 1998, now Pat. No. 6,473,089.

(51) Int. Cl.
*G06T 15/00* (2006.01)
(52) U.S. Cl. .................. 345/505; 345/440; 345/582
(58) Field of Classification Search ............. 345/441, 345/502, 505, 581, 440, 419
See application file for complete search history.

(56) References Cited

U.S. PATENT DOCUMENTS

| 5,001,651 A | 3/1991 | Rehme et al. |
| 5,594,854 A | 1/1997 | Baldwin et al. |
| 5,872,902 A | 2/1999 | Kuchkuda et al. |

OTHER PUBLICATIONS

Akeley, K., "The Silicon Graphics 4D/240GTX Superworkstation", Computer Graphics & Applications vol. 9, No. 4, Jul. 1989, as reprinted in Foley et al., "Computer Graphics Principles and Practice", pp. 890-893.*
Akeley, "The Silicon Graphics 4D/240GTX Superworkstation," 1989, IEEE, pp. 71-83.*
Akeley et al., "High-Performance Polygon Rendering," 1988, ACM, pp. 239-246.*

* cited by examiner

*Primary Examiner*—Phu K. Nguyen
(74) *Attorney, Agent, or Firm*—Vedder, Price, Kaufman & Kammholz, P.C.

(57) ABSTRACT

A method and apparatus for parallel processing of pixel information within a video graphics circuit is accomplished when the video graphics circuit includes a set-up engine, an edgewalker circuit, a span processing circuit, and a plurality of pixel processing circuits. In such an embodiment, the set-up engine receives vertex information and produces object-element information therefrom. The object-element information is provided to the edgewalker circuit, which in turn produces span definition information. The span definition information identifies the starting pixel of a span and the starting pixel parameters. The span information is received by the processing circuit and converted into a plurality of pixel parameters. The plurality of pixel parameters are provided to the plurality of pixel processing circuits wherein each of the plurality of pixel processing circuits processes corresponding pixel parameters to produce pixel information in accordance with the information provided by the processing circuit.

6 Claims, 4 Drawing Sheets

METHOD AND APPARATUS FOR A VIDEO GRAPHICS CIRCUIT HAVING PARALLEL PIXEL PROCESSING

The present application is a continuation of U.S. patent application Ser. No. 09/033,441, filed on Mar. 2, 1998 now U.S. Pat. No. 6,473,089.

TECHNICAL FIELD OF THE INVENTION

This invention relates generally to video graphics circuitry and more particularly to parallel processing of pixel information.

BACKGROUND OF THE INVENTION

Video graphics circuitry is used in a plurality of applications such as computers, video games, and televisions. Such video graphics circuits process images for subsequent display, where a plurality of object-elements form each of the images. The object-elements are polygon shapes and, in most applications, are triangles. By reducing the image to a plurality of triangles, the data that needs to be stored and processed is simplified.

For each triangle of an image, vertex information or vertex parameters are maintained. The vertex parameters include for each vertex of the triangle, a physical location (i.e., the physical pixel location on a display), color information (e.g., RGB values), texture mapping information, and/or Z buffer information (e.g., the depth at which the image is to be perceived when displayed).

When a video graphics circuit receives the vertex parameters, it converts them to object-element information, which is used by an edgewalker circuit to facilitate walking edges of the triangle. Having identified an edge of a triangle, the video graphics circuitry spans along a horizontal line of the triangle. The spanning is done by a pixel by pixel basis wherein pixel information is generated for each pixel that is spanned. The pixel information includes color information, Z buffer information, texture information, etc.

In such video graphics circuits, pixel information is generated in a serial fashion. To enhance the serial processing of pixel information, pipelines are used, but the pixel information is still generated in serial. As is generally known in the art, data processing may be improved by processing the data in a parallel manner. This concept has been applied to video graphics circuits. Such parallel processing video graphics circuits have done the parallel processing at the triangle level or at the span level. In a video graphics circuit that parallel processes at the triangle level, the circuit includes two similar pipelined circuits, such as the ones described above. Thus, the efficiency obtained with parallel triangle processing is obtained by doubling the hardware of the circuit.

Parallel span processing video graphics circuits process span lines in parallel. Span parallel processing requires almost a doubling of the pipeline pixel processing circuitry. As such, a parallel edgewalker circuit and subsequent circuitry is needed to generate the pixel information and achieve the benefits of parallel processing.

In both the span parallel processing and the triangle parallel processing video graphics circuits, additional circuitry is needed to ensure that the parallel processing is done efficiently and without corruption of the data. Even though additional circuitry is added to ensure efficiency, efficiency may not always be optimized. For example, if multiple triangles are being simultaneously rendered in parallel, the efficiency will be optimized when the triangles are of substantially equal size. When the size difference between the triangles becomes substantial, the efficiency of the parallel processing decreases. The additional circuitry also monitors each parallel pipeline to ensure that they are processing relevant parallel data (i.e., to avoid race conditions and corruption of the data).

Therefore, a need exists for a method and apparatus that allows parallel processing within a video graphics circuit that, in many instances, is more efficient and require less hardware than span and triangle parallel processing video graphics circuits.

DETAILED DESCRIPTION OF A PREFERRED EMBODIMENT

Generally, the present invention provides a method and apparatus for parallel processing of pixel information within a video graphics circuit. This may be accomplished when the video graphics circuit includes a set-up engine, an edgewalker circuit, a span processing circuit, and a plurality of pixel circuits. In such an embodiment, the set-up engine receives vertex information and produces object-element information therefrom. The object-element information is provided to the edgewalker circuit, which in turn produces span definition information. The span definition information identifies the starting pixel of a span and the starting pixel parameters. The span information is received by the processing circuit and converted into a plurality of pixel processing circuits wherein each of pixel parameters are provided to the plurality of pixel processing circuits wherein each of the plurality of pixel processing circuits processes corresponding pixel parameters to produce pixel information in accordance with the information provided by the processing circuit. With such a method and apparatus, the benefits of parallel processing are achieved in a video graphics circuit without the requirement of doubling, or near doubling, the hardware requirements and without the additional circuitry to track the efficiency and validity of the information being processed.

Figure 1:
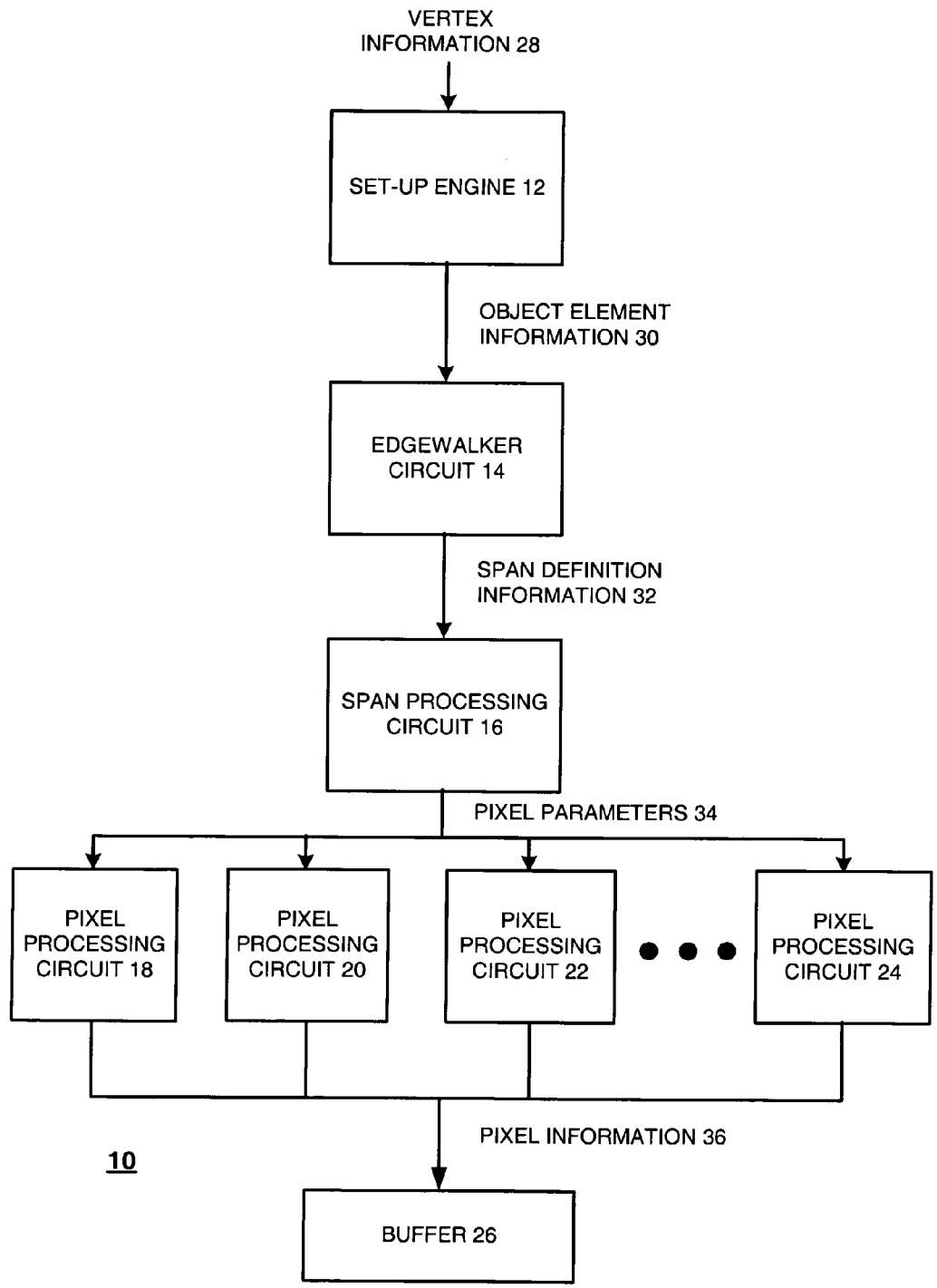
FIG. 1 illustrates a schematic block diagram of a video graphics circuit in accordance with the present invention.

The present invention can be more fully described with reference to FIGS. 1 through 4. FIG. 1 illustrates a schematic block diagram of a video graphics processing circuit 10 that includes a set-up engine 12, an edgewalker circuit 14, a span processing circuit 16, a plurality of pixel processing circuits 18–24 and a buffer 26. The set-up engine 12 receives vertex information 28 and produces therefrom object-element information. The vertex information includes, but is not limited to, color information, texture coordinates, physical coordinates, alpha-blending parameters, perspective information, lighting information, fog information, pixel information derivatives, and/or three dimensional graphics parameters. The set-up engine derives the pixel information derivatives based on the vertex parameters. For example, if one of the vertex parameters were for color information (e.g., 8-bit RGB information), the pixel information derivatives (i.e., the color information at each pixel along an edge of the object element) would be derived based on the color information at each vertex. The computation may be done linearly, or using any linear or non-linear function desired by the graphics designer.

The edgewalker circuit receives the object-element information and at least a portion of the vertex information 28 to produce therefrom span definition information 32. The span definition information, includes, but is not limited to, the physical location of the span start, the length of the span, direction of the span, and/or the span start pixel information.

The span processing circuit 16 receives the span definition information 32 and produces a plurality of pixel parameters 34. The number of pixel parameters 34 depends on the number of pixel processing circuits included in the video graphics circuit 10. For example, the number of pixel processing circuits may be two, four, eight, or any $2^n$ combination. If the video graphics circuitry includes two pixel processing circuits, the span processing circuit would produce the pixel parameters for two pixels in the span line at a given time. Once the pixel processing circuit 18–24 has processed the pixel parameters 34, the pixel information 36 is provided to a buffer 26. The buffer stores the pixel information in a relational order to the pixel processing circuits. Such a relational order will ensure that the pixel information generated in the parallel process remains associated with the appropriate pixel of the object-element.

Figure 2:
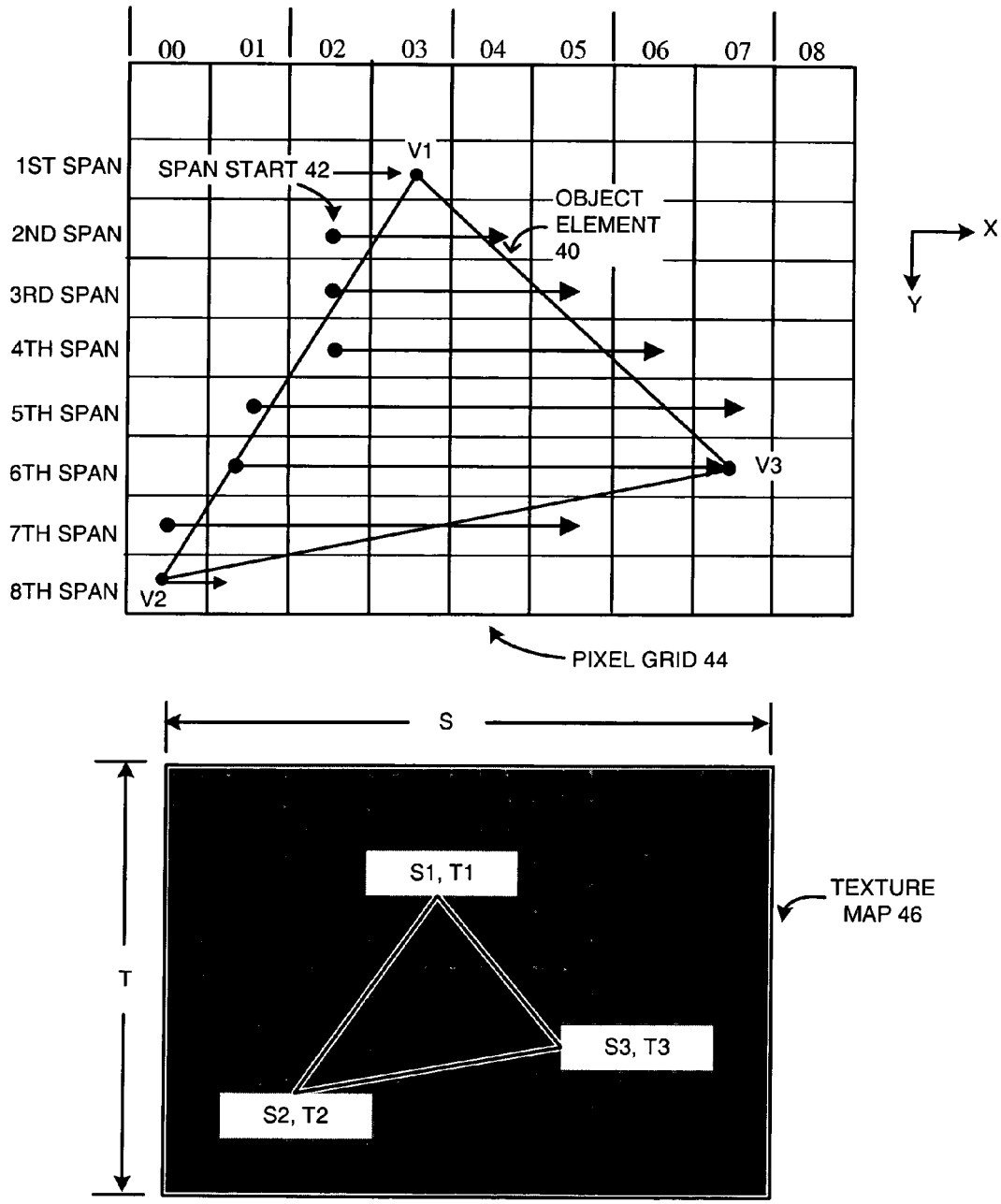
FIG. 2 illustrates a graphical representation of parallel processing an object-element in accordance with the present invention.

FIG. 2 illustrates a graphical repression of the video graphics circuit 10 of FIG. 1 performing dual parallel processing of pixel information. In this embodiment, one of the pixel processing circuits processes even numbered pixels while the other processes odd numbered pixels (where the even and odd relationship is based on the physical pixel locations of the display). As such, the span processing circuit 16 generates even pixel parameters and odd pixel parameters for the corresponding pixel processing circuits. Note that the pixel processing circuits may be processing color information, texture information, Z information, alpha-blending, lighting, fogging, and any other three-dimensional graphics parameters that affect the pixel information. Further note that the pixel information is provided to a frame buffer for display on a monitor, CRT display, LCD display, etc.

As show, object-element 40 is located on a pixel grid 44. The pixel grid is orientated in an X-Y orientation where the positive X direction is from left to right of the pixel grid and the positive Y direction is from top to bottom of the pixel grid 44. The horizontal pixels are numbered from 00 through 08, while the vertical lines are designed with span numbers. These pixel locations are grouped in pairs of two wherein each pair includes an even pixel number and an odd pixel number. As one skilled in the art would readily appreciate, the grouping of pixels is based on the number of pixel processing circuits included in the video graphics circuit, which may be two, four, or $2^n$. The object-element 40 is shown to include three vertexes (V1, V2, V3). For illustration purposes only, each vertex includes a texture coordinate that is shown in the accompanying texture map 46. Thus V1 has corresponding texture coordinates (S1, T1), V2 has corresponding texture coordinates (S2, T2), and V3 has corresponding texture coordinates (S3, T3), As such, the object-element 40 is to be rendered based on the texture map 46.

As shown, the object-element 40 is rendered in 8 spans. Each span has a span start 42, which is identified by a dot. In addition, each span has a span direction, which is indicated by the arrow. As one skilled in the art would rear note, the span direction may be in the X direction or the Y direction. The particular direction selected will be based on the size and orientation of the triangle. For example, if the Delta X of a triangle is substantially greater than the Delta Y of a triangle, the span direction is most beneficial in the X direction. Conversely, if the Delta Y of a triangle is substantially greater than the Delta X of a triangle, the span direction is most beneficial in the Y direction. For triangles that have Delta X and Delta Y that are not substantially different, the span direction may be in either the X or Y direction.

For the initial span, only one pixel is processed. This results because the object-element only occupies one pixel location at the first span. Thus, as illustrated in Table 1 (see below), the pixel parameter for vertex 1 are obtained directly from the vertex information at V1. For the second span, the span start 42 and span length are obtained from the edgewalker circuit while the span start pixel information, or parameters, is calculated from the vertex information of V1 and V2. As shown, the start of span 2 occurs at pixel location 02. Thus, the pixel parameter at pixel location 2 is for even pixel information, which is designated by $PI_e$. As such, the pixel parameter related to pixel location 02 is provided to the even pixel processing circuit. To determine the odd pixel parameters, which are routed to the odd pixel processing circuit, the span processing circuit simultaneously determines the pixel parameter information for pixel location 03. Referring to Table 1, for the second pixel information (i.e., the pixel following the start pixel), the pixel information is obtained by incrementing by X increment (i.e., the previously calculated pixel information derivative in the X direction). Thus, this information ($PI_o$) and $PI_e$ are provided in parallel to the corresponding pixel processing circuits. At the next pipeline interval, the pixel parameters for the next two pixels of span 2 are provided to the corresponding pixel processing circuits.

TABLE 1

| Span | Determine start pixel parameter | Determine $2^{nd}$ pixel parameter | Determine $2n-1$ pixel parameter | Determine $2n$ pixel parameter |
|---|---|---|---|---|
| 1 | obtain from VI | n/a | n/a | n/a |
| 2 | calculate from V1 & V2 = $PI_e$ | $PI_o = PI_e +$ x-inc | $PI_e^+ = PI_e +$ 2*x-inc | n/a |
| 3 | calculate from V1 & V2 = $PI_e$ | $PI_o = PI_e +$ x-inc | $PI_e^+ = PI_e +$ 2*x-inc | $PI_o^+ = PI_o +$ 2*x-inc |
| 4 | calculate from V1 & V2 = $PI_e$ | $PI_o = PI_e +$ x-inc | $PI_e^+ = PI_e +$ 2*x-inc | $PI_o^+ = PI_o +$ 2*x-inc |
| 5 | calculate from V1 & V2 = $PI_o$ | $PI_e = PI_o +$ x-inc | $PI_o^+ = PI_o +$ 2*x-Inc | $PI_e^+ = PI_e +$ 2*x-inc |
| 6 | calculate from V1 & V2 = $PI_o$ | $PI_e = PI_o +$ x-inc | $PI_o^+ = PI_o +$ 2*x-inc | $PI_e^+ = PI_e +$ 2*x-inc |
| 7 | calculate from V1 & V2 = $PI_e$ | $PI_o = PI_e +$ x-inc | $PI_e^+ = PI_e +$ 2*x-inc | $PI_o^+ = PI_o +$ 2*x-inc |
| 8 | calculate from V1 & V2 = $PI_e$ | $PI_o = PI_e +$ x-inc | n/a | n/a |

The second set of pixels of span 2, however, only includes one pixel. Thus, to determine the pixel information, or pixel parameters, for the remaining pixel, the even pixel parameters (i.e., the one obtained for the start pixel) are incrementing by twice the X increment. When the third span of object-element 40 is processed, the pixel parameters for pixel location 2 and 3 are provided in parallel to the odd and even pixel processing circuits. The pixel parameters for pixel location 2 are calculated based on the parameters at V1 and V2. Alternatively, note that the pixel parameters for pixel location 2 may be obtained by adding the Y increment of the pixel information derivative to the pixel parameter at location 2 of span 2. In either case, the appropriate pixel parameters are obtained. The pixel parameters for pixel location 3 of the third span is obtained by incrementing the even pixel parameter by the X increment of the pixel information derivative. For the next pipeline interval, the pixel parameters for pixel location 4 and 5 are obtained by incrementing the even and odd pixel parameters by twice the X increments, respectively. This is shown in Table 1. The same process is performed for span 4.

For span 5 the span start is at pixel location 0, hence it starts at an odd pixel location. To calculate the pixel parameters for the even and odd pairing, the pixel parameters for the even pixel processing circuit in the first pass of span 5 is a don't care condition since the object element does not occupy the corresponding pixel location. As such, the initial odd pixel parameters are obtained based on the span start information, which again can be calculated based on the vertex parameters, or obtained by incrementing the previous span start information. As one skilled in the art would readily appreciate, when incrementing from span to span the incrementing may be in the positive direction and/or in the negative direction.

For the second pass through the parallel pipeline process, the pixel parameters for pixel location 2 and 3 are obtained. To obtain the pixel parameters for pixel location 2, the initial pixel parameters of the odd pipeline ($Pi_o$) is incremented by one X increment (i.e., the pixel information derivative in the X direction). To obtain the pixel parameters for pixel location 3, the initial odd pixel parameter is incremented by 2X. For the next interval of the pipeline, pixel parameters for pixel location 4 and 5 of the fifth span are obtained. Both of these parameters are obtained by incrementing the previous corresponding even and odd pixel parameters by twice the X increment of the pixel information derivative. The processing of span 6 is done in a similar manner as to the processing of span 5.

The seventh span begins at X-direction pixel location 00. Thus, the span begins at an even pixel location and the initial even pixel parameters are calculated from the parameters at V1 and V2. Alternatively, the initial even pixel parameter may be obtained by incrementing the initial odd parameter of span 6 by one in the Y direction and decrementing that information by one in the X direction. Having obtained the initial even pixel parameter, the initial odd pixel parameters and subsequent even and odd pixel parameters can be obtained as shown in Table 1. The same is true for processing the eighth span. Note that the calculation of the initial even pixel parameter and the initial odd pixel parameter are dependent upon each other. The dependency however does not have to be in the grouping as presented with reference to FIG. 2 and may be done in a plurality of other ways. Further note that the parallel processing of pixel parameters requires a minimal of additional hardware (in comparison to triangle and span video graphics circuits) and is consistently more efficient since significantly different sized spans and triangles are no longer an issue.

Figure 3:
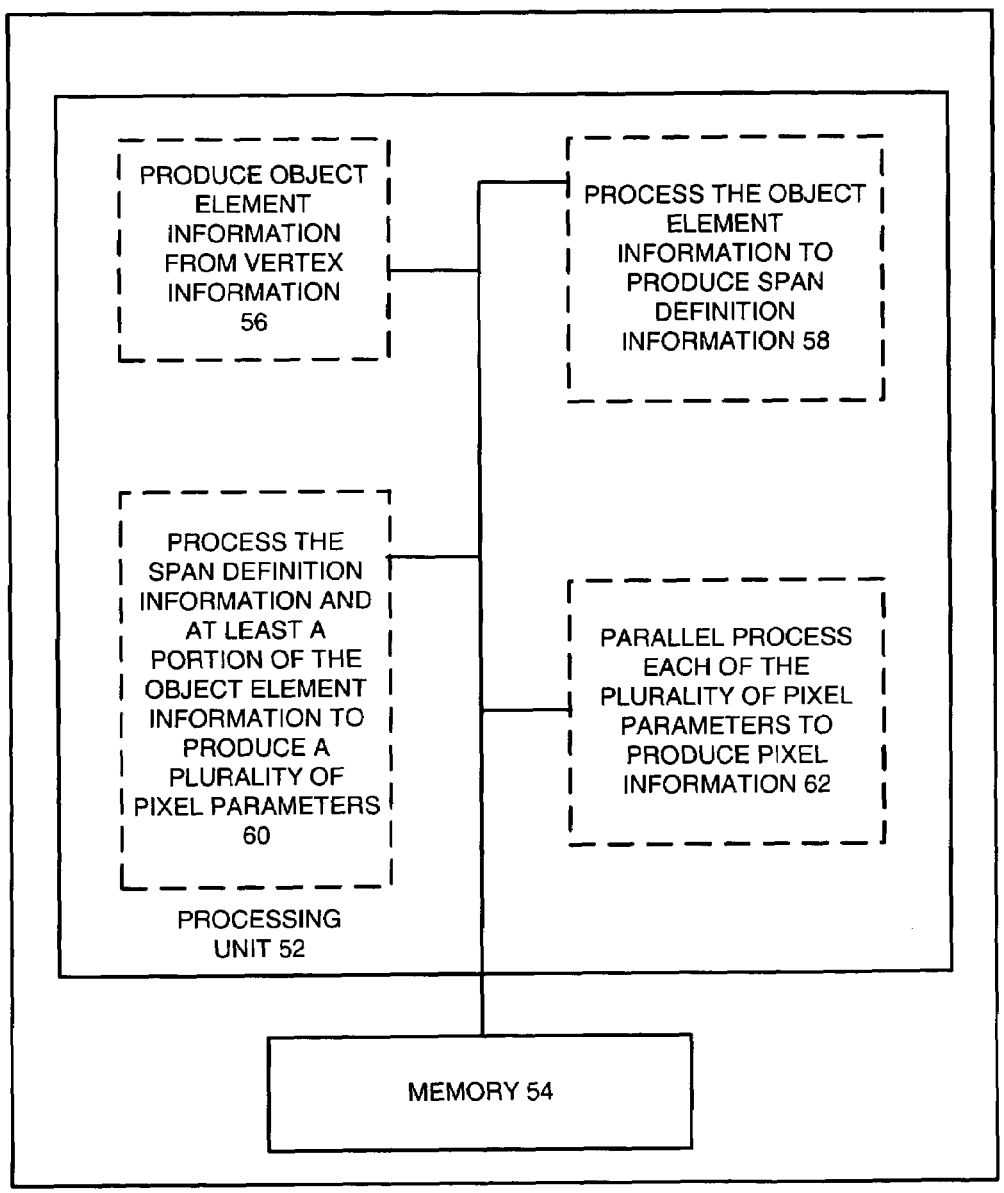
FIG. 3 illustrates a schematic block diagram of an alternate video graphics processing circuit in accordance with the present invention.

FIG. 3 illustrates a schematic block diagram of a video graphics processing circuit 50. The video graphics processing circuit 50 includes a processing unit 52 and memory 54. The processing unit 52 may be a microprocessor, microcontroller, microcomputer, digital signal processor, central processing unit, and/or any device that manipulates digital information based on programming instructions. The memory 54 may be a read-only memory, random access memory, electronically reprogrammable memory, floppy disk, hard drive memory, CD ROM memory, DVD ROM memory, and/or any other means for storing digital information.

The memory 54 stores programming instructions that, when read by the processing unit 52, cause the processing unit 52 to function as a plurality of circuits 56–62. When the processing unit begins reading the program instructions, the processing unit functions as circuit 56 to produce object-element information from vertex information. Having done is, the processing unit functions as circuit 58 to process the object-element information to produce span definition information. Next the processing unit processes, as circuit 60, the span definition information and at least a portion of the object-element information to produce a plurality of pixel parameters. Next, the processing unit functions as circuit 62 to parallel process each of the plural of pixel parameters to produce pixel information. The programming instructions that the processing unit performs will be discussed in greater detail with reference to FIG. 4.

Figure 4:
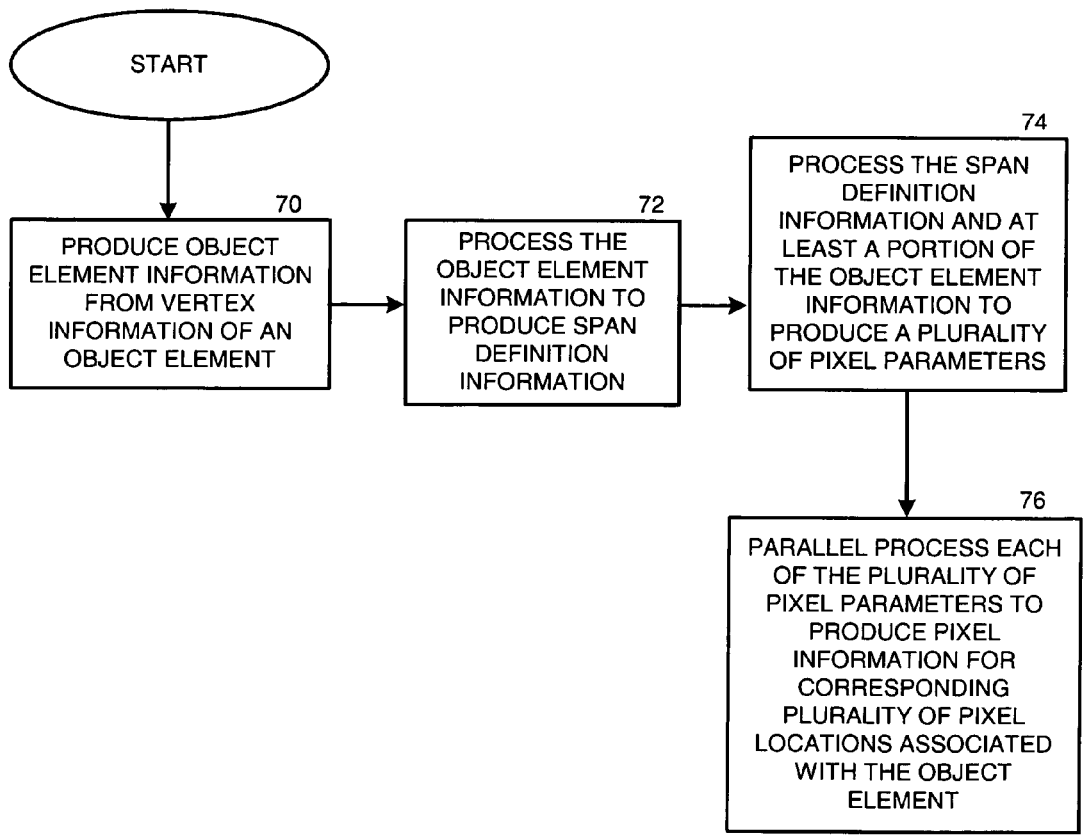
FIG. 4 illustrates a logic diagram of a method for parallel processing of pixel information in accordance with the present invention.

FIG. 4 sates a logic diagram of a method for parallel processing pixel parameters. The process begins at step 70 where object-element information is produced from vertex information. The vertex information includes, but is not limited to, color information, texture coordinates, physical coordinates, alpha blending parameters, perspective information, lighting information, fog information, pixel information derivatives and/or three-dimensional graphics parameters. The process then proceeds to step 72 where the object-element information is processed to produce span definition information. The span definition information includes, but is not limited to, the physical location of the span start, the length of the span, the direction of the span, and/or the span start pixel information.

The process continues at step 74 where the span definition information and at least a portion of the object-element information are processed to produce a plurality of pixel parameters. The number of pixel parameters generated is dependent on the number of parallel pixel processing circuits included in the video graphics circuit. For example, if the video graphics circuit includes two pixel processing circuits, only two pixel parameters would be generated at the pipeline interval. The pixel parameters are generated based on a relationship between each other. For example, an initial pixel parameter is based on the start span information obtained. The next pixel parameter is obtained based on its relationship to the initial one. All subsequent pixel parameters are then based on its relationship to either the initial pixel parameter, or the second pixel parameter. This was discussed in greater detail with reference to FIG. 2. The process then proceeds to step 76 where each of the plurality of pixel parameters are processed to produce pixel information for corresponding plurality of pixel locations associated with the object-element. Note that the pixel parameters for a given pixel location may be color information, texture coordinates, physical coordinates, alpha blending parameters, perspective information (e.g., w of the texture mapping coordinates), lighting information (e.g., (luminance, additive light), fog information, pixel information derivatives and/or three-dimensional graphics parameters.

The preceding discussion has presented a method and apparatus for parallel processing pixel information within a video graphics circuit. By parallel processing pixel parameters to obtain pixel information, the amount of additional hardware to obtain the benefits of parallel processing is reduced over video graphics circuitry that utilize span parallel processing and those that use object-element parallel processing. In addition, the overhead circuitry needed to coordinate the parallel processing of spanned parallel processing video graphics circuits and object-element parallel processing video graphics circuits is substantial reduced.

What is claimed is:

1. A video graphics circuit comprising:
a setup engine that receives vertex information for an object element and provides therefrom, object element information, wherein the object element information includes a plurality of spans, the vertex information being at least one of color information, texture coordinates, physical coordinates, alpha blending parameters, perspective information, lighting information, fog information, pixel information derivatives, and three dimensional graphics parameters;
an edgewalker circuit operably coupled to receive the object element information, wherein the edgewalker circuit processes the object element information to produce span definition information for each of the plurality of spans, the edgewalker circuit operably coupled to a non-parallel span processing circuit;
the non-parallel span processing circuit operably coupled to receive the span definition information and at least a portion of the object element information for each of the plurality of spans, the span definition information being at least one of physical location of span start, length of span, direction of span, and span start pixel information, wherein the non-parallel span processing circuit produces a plurality of pixel parameters from the span definition information and the at least a portion of the object element information for each of the plurality of spans; and
a plurality of pixel processing circuits operably coupled to the non-parallel span processing circuit, wherein each of the plurality of pixel processing circuits receives a corresponding one of the plurality of pixel parameters associated with each of the plurality of spans and produces, therefrom, pixel information for a corresponding pixel location within the object element for each of the plurality of spans, the plurality of pixel processing circuits having an even pixel processing circuit and an odd pixel processing circuit, wherein the span processing circuit provides even pixel parameters of the plurality of pixel parameters to the even pixel processing circuit and provides odd pixel parameters of the plurality of pixels parameters to the odd pixel processing circuit.

2. The video graphics circuit of claim 1 further comprises an initial even pixel parameter that is established based on the physical location of span start, the span start pixel information, and the pixel information derivatives, and further comprises an initial odd pixel parameter is derived based on a relationship to the initial even pixel parameter.

3. The video graphics circuit of claim 1 further comprises a buffer operably coupled to the plurality of pixel processing circuits, wherein the buffer receives the pixel information from each of the plurality of pixel processing circuits and stores the pixel information in a related order.

4. A video graphics circuit comprising:
a setup engine that receives vertex information for an object element and provides therefrom, object element information, wherein the object element information includes a plurality of spans, the vertex information being at least one of: color information, texture coordinates, physical coordinates, alpha blending parameters, perspective information, lighting information, fog information, pixel information derivatives, and three dimensional graphics parameters;
an edgewalker circuit operably coupled to receive the object element information, wherein the edgewalker circuit processes the object element information to produce span definition information for each of the plurality of spans, the edgewalker circuit operably coupled to a non-parallel span processing circuit;
the non-parallel span processing circuit operably coupled to receive the span definition information and at least a portion of the object element information for each of the plurality of spans, the span definition information being at least one of physical location of span start, length of span, direction of span, and span start pixel information, wherein the non-parallel span processing circuit produces a plurality of pixel parameters from the span definition information and the at least a portion of the object element information for each of the plurality of spans; and
a plurality of pixel processing circuits operably coupled to the non-parallel span processing circuit, wherein each of the plurality of pixel processing circuits receives a corresponding one of the plurality of pixel parameters associated with each of the plurality of spans and produces, therefrom, pixel information for a corresponding pixel location within the object element for each of the plurality of spans, the direction of span being an x direction of span when the span length is greater than a threshold and wherein the direction of span comprises a y direction of span when the span length is less than the threshold.

5. A method for parallel processing pixel information, the method comprising:
a) producing object element information from vertex information of an object element, wherein the object element information includes a plurality of spans, the vertex information being at least one of: color information, texture coordinates, physical coordinates, alpha blending parameters, perspective information, lighting information, fog information, pixel information derivatives and three dimensional graphics parameters;
b) using a single edgewalker circuit, processing the object element information to produce span definition information for each of the plurality of spans;
c) using a non-parallel span processing circuit to process the span definition information and at least a portion of the object element information to produce a plurality of pixel parameters having even pixel parameters and odd pixel parameters for each of the plurality of spans; d) parallel processing the each of the plurality of pixel parameters to produce pixel information for a corresponding plurality of pixel locations associated with the object element, the even pixel parameters being processed in parallel with the odd pixel parameters;
e) determining an initial even pixel parameter based on the span definition information, and determining an initial odd pixel parameter based on a relationship to the initial even pixel parameter; and
f) determining subsequent even pixel parameters based on pixel information derivatives of the span definition information and a relationship to the initial even pixel parameter, and determining subsequent odd pixel parameters based on the pixel information derivatives and a relationship to the initial odd pixel parameter.

6. A video graphics circuit comprises:
a processing unit; and memory operably coupled to the processing unit, wherein the memory stores programming instructions that, when read by the processing unit, cause the processing unit to:

(a) produce object element information from vertex information of an object element wherein the object element information includes a plurality of spans, the vertex information being at least one of: color information, texture coordinates, physical coordinates, alpha blending parameters, perspective information, lighting information, fog information, pixel information derivatives, and three dimensional graphics parameters;

(b) process the object element information to produce span definition information for each of the plurality of spans;

(c) process the span definition information and at least a portion of the object element information in a non-parallel manner to produce a plurality of pixel parameters having even pixel parameters and odd pixel parameters for each of the plurality of, spans;

(d) parallel process each of the plurality of pixel parameters to produce pixel information for a corresponding plurality of pixel locations associated with the object element the even pixels parameters being processed in parallel with the odd pixel parameters;

(e) process the span definition information and the at least a portion of the object element information to produce the even pixel parameters and the odd pixel parameters;

(f) determine an initial even pixel parameter based on the span definition information, and determine an initial odd pixel parameter based on a relationship to the initial even pixel parameter; and (g) determine subsequent even pixel parameters based on pixel information derivatives of the span definition information and a relationship to the initial even pixel parameter; and determine subsequent odd pixel parameters based on the pixel information derivatives and a relationship to the initial odd pixel parameter.

* * * * *